Sept. 2, 1952     W. T. SERMEUS     2,609,436
PARTITION

Filed May 26, 1950     2 SHEETS—SHEET 1

INVENTOR
W. T. SERMEUS
BY J. W. Schmied
ATTORNEY

Sept. 2, 1952 W. T. SERMEUS 2,609,436
PARTITION

Filed May 26, 1950 2 SHEETS—SHEET 2

INVENTOR
W. T. SERMEUS
BY
J. W. Schmied
ATTORNEY

Patented Sept. 2, 1952

2,609,436

UNITED STATES PATENT OFFICE 2,609,436

PARTITION

William T. Sermeus, New York, N. Y., assignor to Bell Telephone Laboratories, Incorporated, New York, N. Y., a corporation of New York Application May 26, 1950, Serial No. 164,555

7 Claims. (Cl. 177—339)

This invention relates to visual signaling arrangements which are particularly adapted for use in conjunction with supervised telephone operators' positions.

In certain telephone offices or installations a plurality of operators' positions are often supervised by one or more supervisory operators. Under certain circumstances it becomes necessary for a position operator to request the assistance of a supervisory operator. It has heretofore been the practice for a position operator to signal the supervisory operator by manipulating a key or switch so that a lamp mounted on a standard or the like at the operator's position would be energized and thereby attract the attention of the supervisor.

Furthermore, in order to limit or otherwise effectively eliminate room noise between adjacent operators' positions a common baffle partition usually separates one position from the adjacent position. In recent years, in many telephone offices, these baffle partitions have been constructed from a transparent material known technically as acrylic plastic and more commonly by the trade name of Lucite or Plexiglas. This plastic is light in weight and has many desirable properties. For example, a high impact strength and is readily susceptible to forming and cutting. These characteristics, in addition to others, make it ideally suited for use as baffle partitions in modern plants.

It has heretofore been known that colorless transparent material, such as optical glass or fused quartz, would transmit light from one point to another even though said points were not in line of sight with respect to one another, but until the development of acrylic plastics applications for this light piping effect were limited as residual color in ordinary glass absorbed much of the light in the path of travel if said path exceeded a few inches in length, and furthermore, use of special types of glass and other colorless materials was restricted by cost and/or other factors to a few special applications.

These limitations to light piping were overcome by the acrylic plastics. Being colorless and crystal clear and having a high coefficient of light transmission they showed little absorption of the light passing therethrough.

By means of an acrylic bar or rod, light can be piped to illuminate an area at a considerable distance from the source of light. In the prior art acrylic dials were made visible by light piped from concealed lamps. Advertising signs of acrylic sheet were illuminated by a distant light source whose energy was transmitted by said sheet. Photoelectric cells were used to perform a variety of operations by light transmitted through acrylic sheets. Medical instruments of many types used light piped through acrylic rods to illuminate an object or portion of the human anatomy wherever working space was limited and should not be subjected to the heat energy of an electrical lamp.

A special application of light piping is the effect known as edge lighting. The distinguishing characteristic of edge lighting is that the light introduced into the edge of an acrylic sheet is caused to leave the sheet at spots along the surface or edges as desired by frosting the sheet at these spots or otherwise roughening the surface of the sheet. The sheet at these points, therefore, appears to glow. Accordingly, it is an object of this invention to use the edge lighting characteristic of acrylic sheets by suitably preparing acrylic baffle partitions at telephone operators' positions so that they will act as a visual indicator that can be operated by the position operator at the time she needs the assistance of a supervisory operator.

Another object of this invention is the elimination of lighting posts and visual indicator lamps attached thereto in telephone offices and other installations by a design of acrylic baffle partitions which can be used as visual indicators.

A feature of this invention is that the support rods which hitherto have been used for supporting indicator lamps may now be eliminated and the entire table surface at the operator's position which formerly maintained the support rods and lamps may be used for storing or placing books or the like thereon. Furthermore, another advantageous feature of this invention is that by using acrylic baffle partitions the entire edge of the baffle partition may be made to illuminate so that when an operator requires the assistance of a supervisory operator two or more rather long surfaces are lit. This arrangement can more easily attract the attention of the supervisory operator than the lamp arrangements of the prior art. Another advantageous feature of this invention is that the light source which energizes the acrylic baffle partitions may be modified in color very easily by using colored lamps to energize the baffle partitions or by coloring an edge of said partitions with a dye. In operation the indicating baffle partitions are energized by the manipulation of a key or switch at the operator's position by the position operator at the time she requires the assistance of the supervisor.

For a full understanding of the operation and structure of this invention, as well as other objects thereof, reference is herein made to the drawings wherein.

Figure 3:
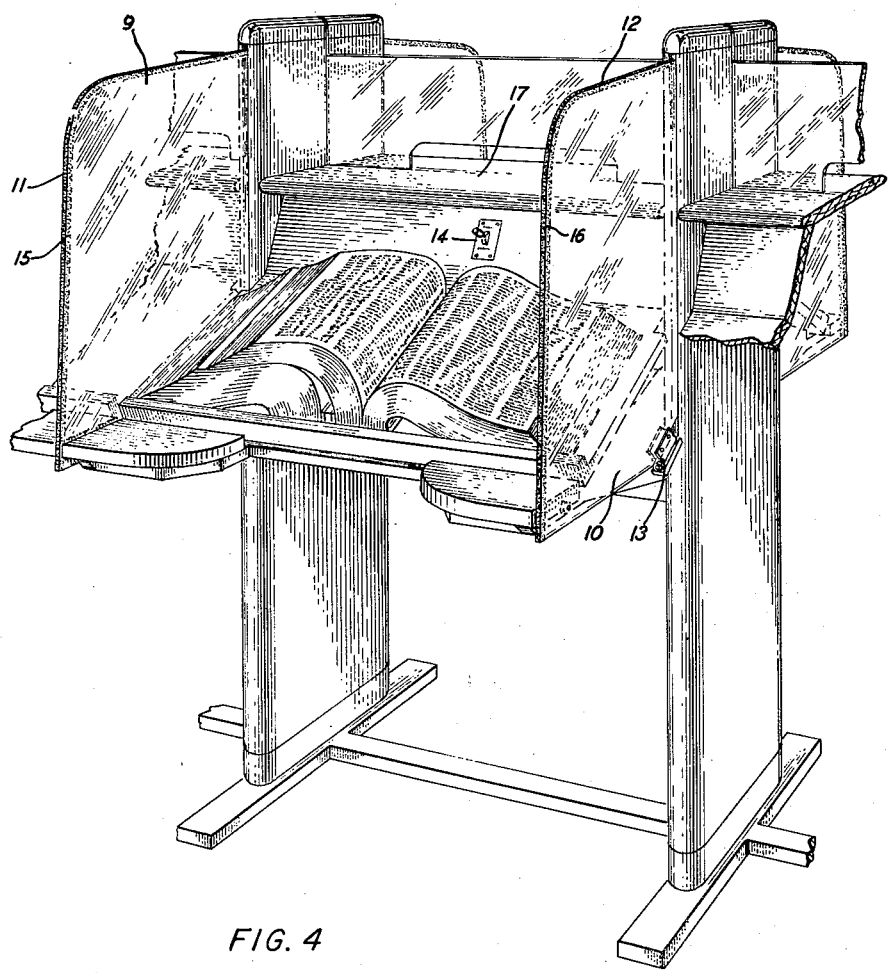
Figure 4:
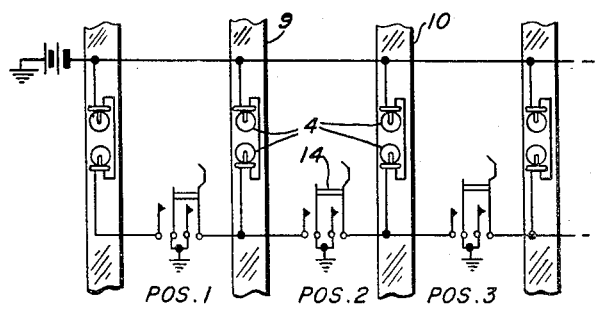

Fig. 3 shows a complete operator's position having light energized acrylic baffle partitions arranged so that they can be used as a visual indicator by operating a key or switch at that position; and Fig. 4 is a schematic diagram of the circuits involved in the control of the indicator lamps and illustrates how the actuation of a key at any one position results in the lighting of the lamps on both sides of the position.

Figure 1:
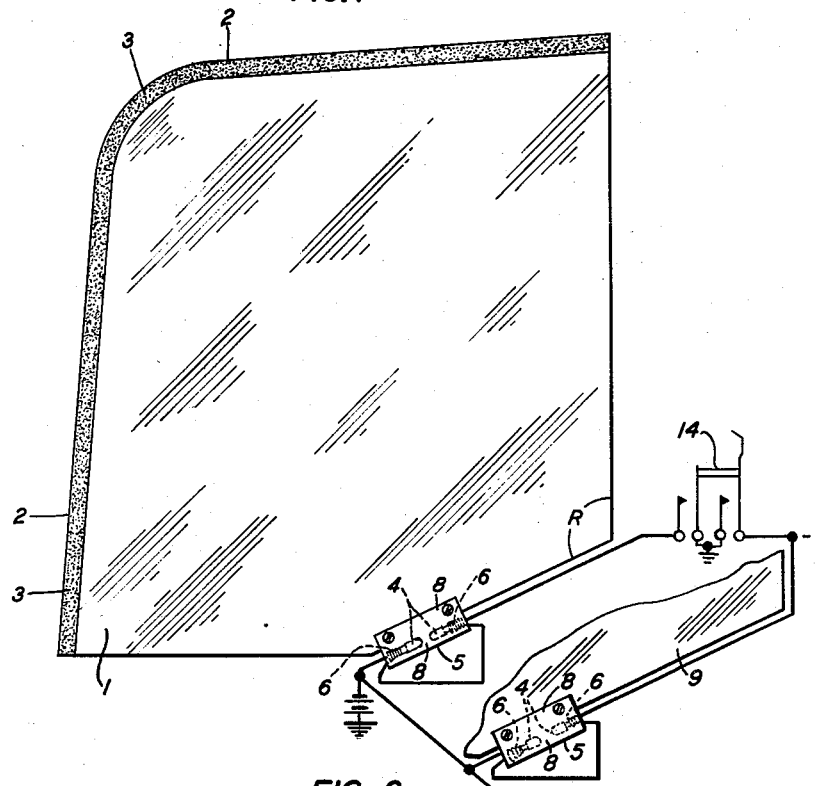
Fig. 1 shows an acrylic baffle partition and attached light energizing source including reflector.

In Fig. 1 an acrylic baffle board 1 is shown which is essentially square in shape. The thickness of the baffle board is not critical. It is necessary, however, that the board be thick enough that it can physically support itself and can otherwise withstand the usual physical forces applied thereto by the position operator. One of the corners of the baffle board is cut off or otherwise curved so that a sharp projection will not appear therefrom when the baffle board is positioned at the operator's table. The other corner opposite thereto is preferably cut off at an angle so that light energizing source 4 including reflector 5 may be affixed thereto.

Acrylic plastic which is polished or otherwise free from irregularities on the surface thereof wil not give off light. Therefore, in order for this partition to perform its indicating functions, it is necessary to roughen one or more of the edges of the baffle partition so that light will appear therefrom such as at 2. In order to give a more certain indication that the supervisor is being requested, it is desirable to roughen both sides of the surface close to the roughened edge to a depth of one-half inch or so such as at 3. This roughening procedure may be performed by sandblasting or other etching processes. There is also available a frosting lacquer which may be applied in a manner similar to paint to accomplish the same result as sandblasting, etc.

When a reflector is affixed to the cut corner and otherwise energized by light from a lamp associated therewith, the light will be obstructed by the roughened edges and give a rather bright indication at those edges. The intensity of this light is controlled by the light energy given off by the energizing source. By increasing the value of angle R the substantially vertical portion of edge 2 and surface 3 illuminates more than the substantially horizontal portion thereof. If the baffle partition is physically large it is desirable to increase the size of the energizing source over that which would be used with a smaller partition. If an ordinary white-yellow incandescent lamp is used the roughened edge of the baffle partition gives off a light which is essentially white-yellow in color. However, under certain conditions of use it might be advantageous to change the color of this indication by including a color filter in the energizing source or otherwise employing a lamp with a colored envelope in the energizing source. Under such circumstances of use the roughened edge and/or surface will give off a light which corresponds to the light from the energizing source. It is believed that red has greater attracting qualities than any other color of the spectrum.

Figure 2:
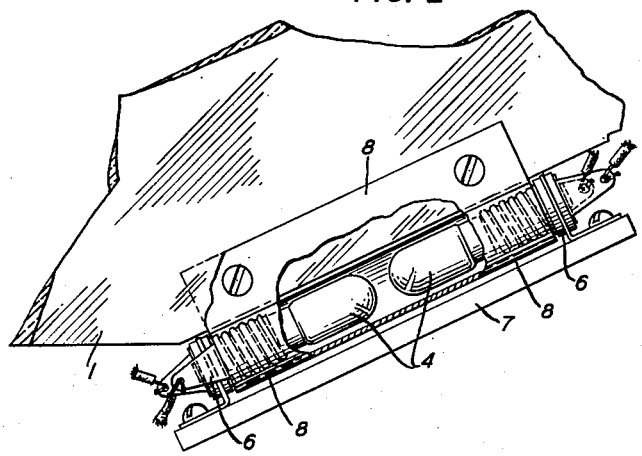
Fig. 2 shows an enlarged view of the light energizing source and reflector of Fig. 1.

In Fig. 2 an enlarged view of the light energizing source of Fig. 1 is shown with a broken-away section of the lamp reflector coupled thereto. In general, it comprises two lamps 4 and sockets 6 therefor which are mechanically coupled to one another by base piece 7 and associated therewith is a polished light reflector 8. The reflector is so shaped that it will form a pressed fit on baffle partition 1. With such an arrangement the reflector and light source may be easily placed on and removed from the baffle partition for maintenance. The number of lamps used in the energizing source is not critical. However, it is preferable that sufficient light intensity be generated by the lamps that the baffle partition gives a satisfactory visual indication; nor is the arrangement or material with which the reflector element is constructed extremely critical. It is preferable, however, that the reflector present a polished surface to the lamps. For a permanent positioning of the light source to the baffle partition the reflector may be fastened by screws or the like to the baffle partition.

In Fig. 3 a complete operator's table is shown with an individual position on each side thereof. Two baffle partitions are used at each position, such as, partitions 9 and 10 at the position most clearly shown. Both of the edges 11 and 12 and surfaces 15 and 16 of said baffle partitions are roughened so that they will illuminate when energized by the light source individual thereto. The light sources are out of the way in that they are attached to the angular cut corner of the baffle partition such as the position of light source 13 with respect to partition 10. On the front panel shown a key 14, which makes or breaks the energizing circuit for the light sources at the nearest operator's position, can be manipulated by the position operator at any particular time she requires or requests the assistance of the supervisory operator. From a generic standpoint key 14 may be located at any near or remote point to indicate that the position having the illuminated partitions needs attention. The lamp energizing circuit arrangement is not critical, of course, and may be a simple series circuit; however, the key 14 should preferably be connected to an energizing circuit so that it controls the light sources for two adjacent position-defining partitions such as partitions 9 and 10 as clearly shown in Fig. 4. It is to be noted that the top board 17 at the operator's position is free from objectionable posts which formerly supported the indicator lamps of the prior art. This space may be used for storing books or other items.

In certain offices where space is at a premium the operators' tables may be constructed adjacent to one another in a manner indicated by the relationship of the broken-away sections of the tables to the left and right of the table fully shown. With such an arrangement the indicating partitions such as 9 and 10 are common to two positions. However, the operator needing supervision will be distinguished from the adjacent operators in that the baffle partitions on both sides of the requesting position will be illuminated.

Although in this specification the visual indication arrangement has been shown and explained in detail in conjunction with telephone operators' positions, it is obvious that such a visual arrangement may be used at one or more supervised interviewer positions or the like. Moreover, acrylic plastic need not be the only material from which satisfactory indicator baffle partitions may be constructed. It is to be understood, therefore, that the above-described arrangements are illustrative of the applications of the principles of this invention. Numerous other arrangements may be devised by those skilled in the art without departing from the scope of the invention.

What is claimed is:

1. In a system for identifying a plurality of adjacent telephone operators' positions whereat a plurality of acrylic plastic baffle partitions are arranged to segregate each of said operators' positions from the adjacent operators' positions, indicator means comprising each of said baffle partitions having a substantial portion of the edge surfaces thereof roughened by frosting or the like so as to present an obstruction to light transmitted therethrough, a plurality of light sources, one individual to each of said baffle partitions and beng coupled thereto by close physical positioning so as to transmit light therein whereby said roughened edges are illuminated, and electrical switching means individual to each of said operators' positions and being connected to the light sources individual to the partitions thereof so as to control the energization of said light sources.

2. In a system for identifying a plurality of supervised operators' positions whereat one or more transparent baffles having a high coefficient of light transmission are located, an indicator arrangement comprising each of said baffles having a substantial portion of a surface thereof frosted so as to illuminate when light strikes said surface, a plurality of light sources, one individually coupled to each of said baffles so as to transmit light therein, and means for controlling the energization of one or more of said light sources.

3. In an operator's position having a working table and one or more baffles of transparent, colorless plastic located thereat, a visual indicator arrangement comprising a light source for energizing said transparent plastic baffles with light energy, said baffles having a portion of the surface thereof prepared so as to illuminate when subjected to the light energy of said source, and means located at said operator's position for controlling the operation of said light source.

4. Equipment for an operator's position comprising a table, two substantially rectangular transparent sheets having a high coefficient of light transmission, said sheets being vertically positioned at opposite ends of said table and the exposed edges of said sheets being frosted or otherwise prepared so as to illuminate when subjected to light, a light source mechanically coupled to a bottom edge of each of said sheets, and means located at said operator's position for controlling the energization of said light sources.

5. Equipment for an operator's position comprising a table, two substantially rectangular sheets having a high coefficient of light transmission vertically positioned at opposite ends of said table, the upper outer corner of each of said sheets being rounded and the corner diagonally opposite thereto being angularly cut, the exposed vertical, curved and horizontal edges of each of said sheets being frosted or otherwise prepared so as to illuminate when subjected to light, a light source mechanically coupled to the angularly cut edge of each of said sheets, and means located at said operator's position for controlling the energization of said light sources.

6. Signaling means for an operator's position comprising a partition separating the said position from an adjacent position and having an exposed illuminatable edge, and means for illuminating the edge of said partition.

7. Signaling means for an operator's positon comprising a pair of position-defining partitions each having an exposed illuminatable edge, and means for illuminating an edge of each of said partitions.

WILLIAM T. SERMEUS.

REFERENCES CITED

The following references are of record in the file of this patent:

UNITED STATES PATENTS

| Number | Name | Date |
|---|---|---|
| 2,276,114 | Sture | Mar. 10, 1942 |
| 2,481,394 | Cannava | Sept. 6, 1949 |